(12) United States Patent
Stephens et al.

(10) Patent No.: US 8,762,179 B2
(45) Date of Patent: Jun. 24, 2014

(54) AUTOMATED INSURANCE ENROLLMENT, UNDERWRITING, AND CLAIMS ADJUSTING

(75) Inventors: Jack Stephens, Boise, ID (US); Daniel W. Crandall, Boise, ID (US); Jeff Brown, Boise, ID (US); Brian Emmen, Boise, ID (US)

(73) Assignee: Pets Best Insurance Services, Boise, ID (US)

( * ) Notice: Subject to any disclaimer, the term of this patent is extended or adjusted under 35 U.S.C. 154(b) by 1051 days.

(21) Appl. No.: 11/559,525

(22) Filed: Nov. 14, 2006
(Under 37 CFR 1.47)

(65) Prior Publication Data
US 2010/0017234 A1 Jan. 21, 2010

Related U.S. Application Data

(63) Continuation-in-part of application No. 10/849,691, filed on May 19, 2004, now abandoned, which is a continuation of application No. 10/824,721, filed on Apr. 15, 2004, now abandoned, which is a continuation-in-part of application No. 09/599,037, filed on Jun. 21, 2000, now abandoned.

(60) Provisional application No. 60/736,990, filed on Nov. 15, 2005, provisional application No. 60/139,859, filed on Jun. 21, 1999.

(51) Int. Cl.
*G06Q 40/00* (2012.01)
(52) U.S. Cl.
USPC .................................................. 705/4; 705/35
(58) Field of Classification Search
USPC .............................................................. 705/4
See application file for complete search history.

(56) References Cited

U.S. PATENT DOCUMENTS

| 4,975,840 | A | * | 12/1990 | DeTore et al. ............... 705/4 |
| 5,191,522 | A |   | 3/1993  | Bosco et al. |
| 5,324,077 | A |   | 6/1994  | Kessler et al. |
| 5,689,649 | A |   | 11/1997 | Altman et al. |
| 5,774,883 | A |   | 6/1998  | Andersen et al. |

(Continued)

OTHER PUBLICATIONS

Veterinary Pet Insurance ( http://web.archive.org/web/20010614065835/http://www.petinsurance.com/; http://web.archive.org/web/20010803104259/http://ph.petinsurance.com/about-vpi.cfm; http://web.archive.org/web/20010803104817/http://ph.petinsurance.com/forms/inhttp://web.archive.org/web/20011023205612/http://ph.petinsurance.com/forms/claimform.cfm).*

(Continued)

*Primary Examiner* — Narayanswamy Subramanian
*Assistant Examiner* — Asha Puttaiah
(74) *Attorney, Agent, or Firm* — Stoel Rives LLP

(57) ABSTRACT

An insurance enrollment and underwriting method includes providing a first user interface with one or more controls for enabling a user to specify one or more health conditions in an enrollment application for pet health insurance. Data representing one or more health conditions specified through the first user interface is received. That data is electronically processed. Each condition is electronically flagged as a condition that is acceptable, precluded, or for manual review. A dollar limit of coverage for each of a plurality of diagnoses in lieu of one or more exclusions is calculated. The plurality of diagnoses include one or more diagnoses related to one or more of the health conditions. Where all conditions are and flagged as acceptable or determined to be acceptable following a manual review, an active policy is packaged to include coverage for each of the plurality of diagnoses up to each diagnosis' corresponding dollar limit of coverage.

33 Claims, 16 Drawing Sheets

(56) References Cited

U.S. PATENT DOCUMENTS

| | | |
|---|---|---|
| 5,897,619 A | 4/1999 | Hargrove et al. |
| 5,956,687 A | 9/1999 | Wamsley et al. |
| 5,966,693 A | 10/1999 | Burgess |
| 6,076,072 A | 6/2000 | Libman |
| 6,092,047 A | 7/2000 | Hyman et al. |
| 6,186,793 B1 | 2/2001 | Brubaker |
| 6,272,471 B1 | 8/2001 | Ssegal |
| 6,456,979 B1 | 9/2002 | Flagg |
| 6,604,080 B1 | 8/2003 | Kern |
| 7,698,155 B1 | 4/2010 | Prasad et al. |
| 8,050,947 B2 | 11/2011 | Stephens |
| 2001/0049611 A1 | 12/2001 | Peach |
| 2002/0052761 A1 | 5/2002 | Fey et al. |
| 2002/0128879 A1 | 9/2002 | Spears |
| 2003/0083906 A1 | 5/2003 | Howell et al. |
| 2004/0039609 A1 | 2/2004 | Burkitt |
| 2005/0203781 A1 | 9/2005 | Wilson et al. |
| 2006/0074724 A1* | 4/2006 | Schwartz et al. ............... 705/4 |
| 2007/0250353 A1* | 10/2007 | Schwartz et al. ............... 705/4 |

OTHER PUBLICATIONS

Definition of Breed, The American Heritage Dictionary of the English Language, 2000, p. 229, 4th Edition, Houghton Mifflin Company, United States.

Definition of Breed, Webster's Third New International Dictionary of the English Language Unabridged, 2002, p. 274, Merriam-Webster, Incorporated, United States.

Definition of Breed, The New Oxford American Dictionary, 2005, pp. 210-211, 2nd Edition, Oxford University Press.

\* cited by examiner

ENROLLMENT USER INTERFACE

Owner's Name:
Street:
City:
State:
Zip Code:

⎫
⎬ 38
⎭

Pet's Name:

○ male
○ female

Species:
Breed:
age:
color:

⎫
⎬ 40
⎭

Past/Current
Health Conditions

Ablation of Ear
Abrasion
Abscess
Acanthosis Nigricans
Ach Receptor Antibody Titer
Acne/Cellulitis
Acquired Achalasia
Activated Clotting Time (ACT)
Acute Renal Failure
Addison's Disease
Adrenal Profile

— 42

RESET   SUBMIT
— 44

CLAIM SUBMISSION USER INTERFACE

Diagnosis

Ablation of Ear
Abrasion
Abscess
Acanthosis Nigricans
Ach Receptor Antibody Titer
Acne/Cellulitis
Acquired Achalasia
Activated Clotting Time (ACT)
Acute Renal Failure
Addison's Disease
Adrenal Profile Policy Number:
Date of Claim:
Amount:

Reset    Submit

FIG. 4

RISK ZONE DATABASE

| ZONE ID | RISK TYPE | RISK SCORE | ZONE BOUNDARY |
|---------|-----------|------------|---------------|
| 1 | RISK (1) | SCORE (1) | BOUNDARY (1) |
| 2 | RISK (2) | SCORE (2) | BOUNDARY (2) |
| 3 | RISK (3) | SCORE (3) | BOUNDARY (3) |
| ... | ... | ... | ... |
| x | RISK (x) | SCORE (x) | BOUNDARY (x) |

LOCATION DATABASE
- CUSTOMER TABLE
- LOCATION TABLE
- GIS TABLE
- RATINGS TABLE

CUSTOMER TABLE

| CUSTOMER ID | PROFILE |
|-------------|---------|
| 1 | PROFILE (1) |
| 2 | PROFILE (2) |
| 3 | PROFILE (3) |
| ... | ... |
| n | PROFILE (n) |

| LOCATION TABLE 90 | | |
| --- | --- | --- |
| LOCATION ID 104 | ADDRESS 106 | CUSTOMER ID 108 |
| 1 | ADDRESS (1) | CUSTOMER (a) |
| 2 | ADDRESS (2) | CUSTOMER (b) |
| 3 | ADDRESS (3) | CUSTOMER (c) |
| ... | ... | ... |
| n | ADDRESS (N) | CUSTOMER (m) |

FIG. 9

| GIS TABLE 92 | | |
| --- | --- | --- |
| GIS ID 112 | COORDINATES 114 | LOCATION ID 116 |
| 1 | X1,Y1 | LOCATION (aa) |
| 2 | X2,Y2 | LOCATION (bb) |
| 3 | X3,Y3 | LOCATION (cc) |
| ... | ... | ... |
| n | Xn,YN | LOCATION (mm) |

FIG. 10

| 94 | RATINGS TABLE | | |
|---|---|---|---|
| | 160 | 162 | 164 |
| | RISK ID | RISK TYPE | BASE RATING |
| 158 | 1 | RISK (1) | RATING (1) |
| | 2 | RISK (2) | RATING (2) |
| | 3 | RISK (3) | RATING (3) |
| | ... | ... | ... |
| | n | RISK (n) | RATING (n) |

AUTOMATED INSURANCE ENROLLMENT, UNDERWRITING, AND CLAIMS ADJUSTING

CROSS REFERENCE TO RELATED APPLICATIONS

This application Claims the priority of provisional application Ser. No. 60/736,990 Filed Nov. 15, 2005 and is a continuation in-part of application Ser. No. 10/849,691 filed May 19, 2004 now abandoned which is a continuation of application Ser. No. 10/824,721 filed Apr. 15, 2004, now abandoned which is a continuation-in-part of application Ser. No. 09/599,037 filed Jun. 21, 2000 now abandoned and claiming priority of provisional application Ser. No. 60/139,859 filed Jun. 21, 1999. Each of these references is incorporated herein by reference in its entirety.

BACKGROUND

Pet health insurance is gaining popularity and proving a useful tool for pet owners. Consumers of pet insurance, or any other type of insurance for that matter, benefit when insurance providers are able to implement efficient enrollment, underwriting, and claims procedures. Insurance providers benefit when those same procedures provide certainty as to the provider's potential exposure to claims.

The field of pet insurance has many inherent uncertainties that can prevent providers from providing efficient enrollment, underwriting, and claims services. For example, it would not be unexpected that a less than truthful consumer would seek pet insurance to cover expenses related to a pet's pre-existing condition. To address this situation, provider's of pet insurance may take steps to manually verify the pet's heath by contacting the pet's veterinarian before deciding to issue a policy and before paying any claim. This manual approach inflates insurance costs for the consumer. Eliminating this manual approach without a viable alternative exposes the insurance provider to unknown risks—also serving to inflate insurance costs.

Moreover, the nature of insurance is rapidly evolving. On a geographic basis, the insurance industry has recently begun to track, compile, and monitor various risks according to zip code or some larger scale. As an example, a geographic area for a given zip code may contain a number of different risks zones related to the health of a pet. Identifying a location as being within that zip code does not, by itself, mean the location lies within or outside a risk zone. Before an insurance policy is issued, a manual examination by an underwriter is often required to determine if a given location falls within a particular risk zone. Not only is this manual examination time consuming, its accuracy can be suspect.

Another challenge facing the insurance industry has been to balance risk and claims paid against the premium rates to ensure profitability. One of the greatest uncertainties has been the unanticipated insured risk, only determined to be covered later, usually after litigation. These result in long lists of terms, conditions and exclusions to coverage. Market needs and desires often result in exceptions to the exclusions, which also may have exclusions, and so on. Additionally, for desired insurance coverage which falls outside of the scope of a normal policy, endorsements or riders are provided that also may include exclusions, exceptions and so on.

DESCRIPTION OF THE DRAWINGS

FIG. 3 illustrates an exemplary screen view of a an enrollment interface according to an embodiment of the present invention.

FIG. 4 illustrates an exemplary screen view of a claim submission interface according to an embodiment of the present invention.

FIG. 9 illustrates the structure of a location table according to an embodiment of the present invention.

FIG. 10 illustrates the structure of a GIS (Geographic Information System) table according to an embodiment of the present invention.

DETAILED DESCRIPTION

Introduction:

Embodiments of the present invention provide efficiencies in the enrollment, underwriting, and claims procedures for pet health insurance. Embodiments also serve to provide a level of certainty as to risk exposure by specific dollar limits of coverage for differing risk types and by calculating an insurance rating based on geographic risk zones.

Figure 1:
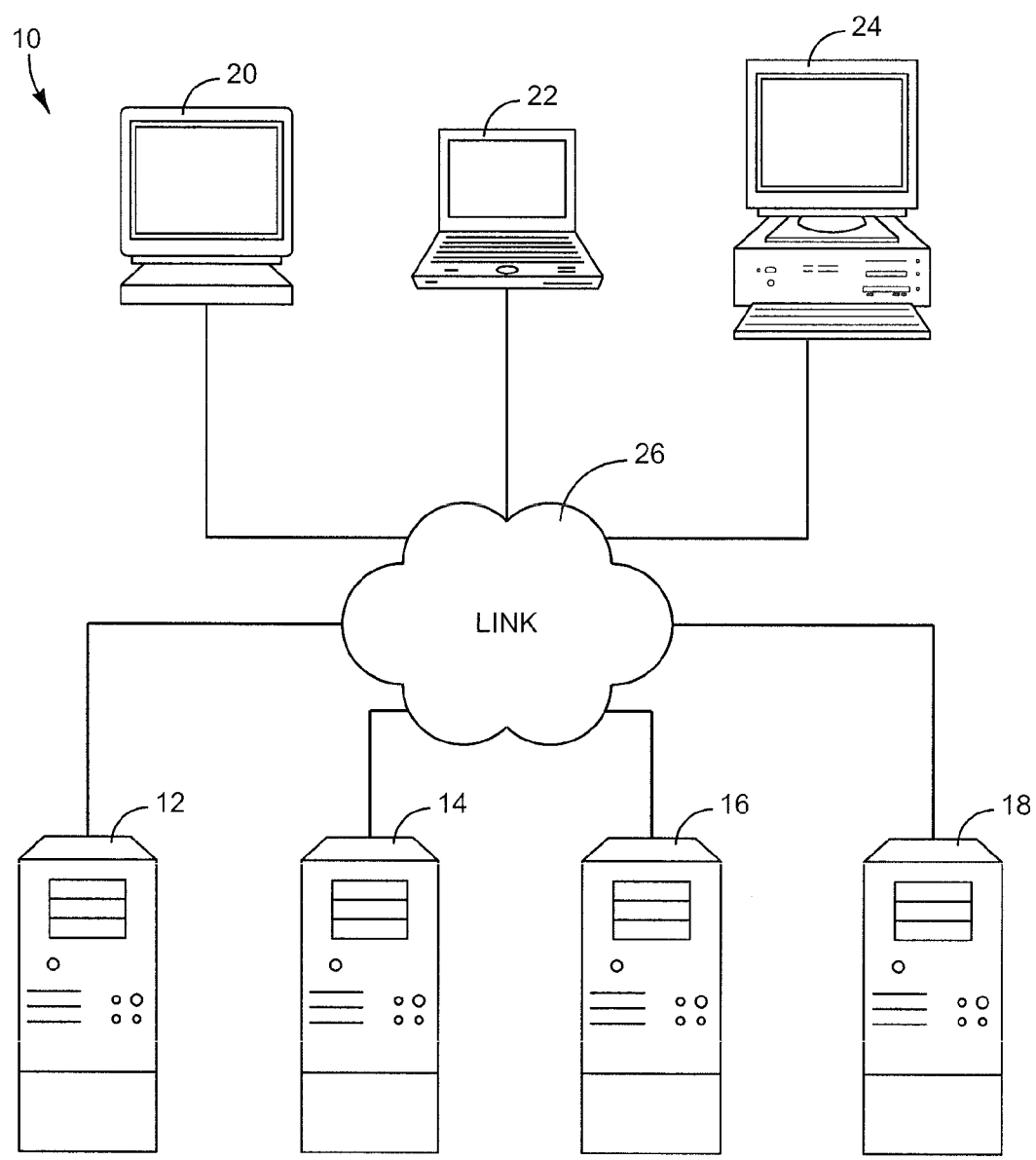
FIG. 1 is a schematic illustration of an exemplary computer network for use in implementing various embodiments of the present invention.

Network Environment:

FIG. 1 schematically illustrates exemplary network environment 10 for use in implementing various embodiments of the present invention. Network 10 includes server computers 12-18 and client computers 20-24. Server computers 12-18 represent generally any computing devices capable serving data and/or applications over network 10. Client computers 20-24 represent generally any computing devices capable of interacting with server computers 12-18 over network 10.

Link 24 represents generally a cable, wireless, or remote connection via a telecommunication link, an infrared link, a radio frequency link, or any other connector or system of connectors that provides electronic communication between client computers 20-24 and server computers 12-18. Link 24 may include an intranet, the Internet, or a combination of both. Each portion of link 24 connecting a given component one device to another may or may not be distinct from the remaining portions of link 24. For example databases two or more of server computers 12-18 may be directly connected to another server computer via one or more separate and distinct links.

Figure 2:
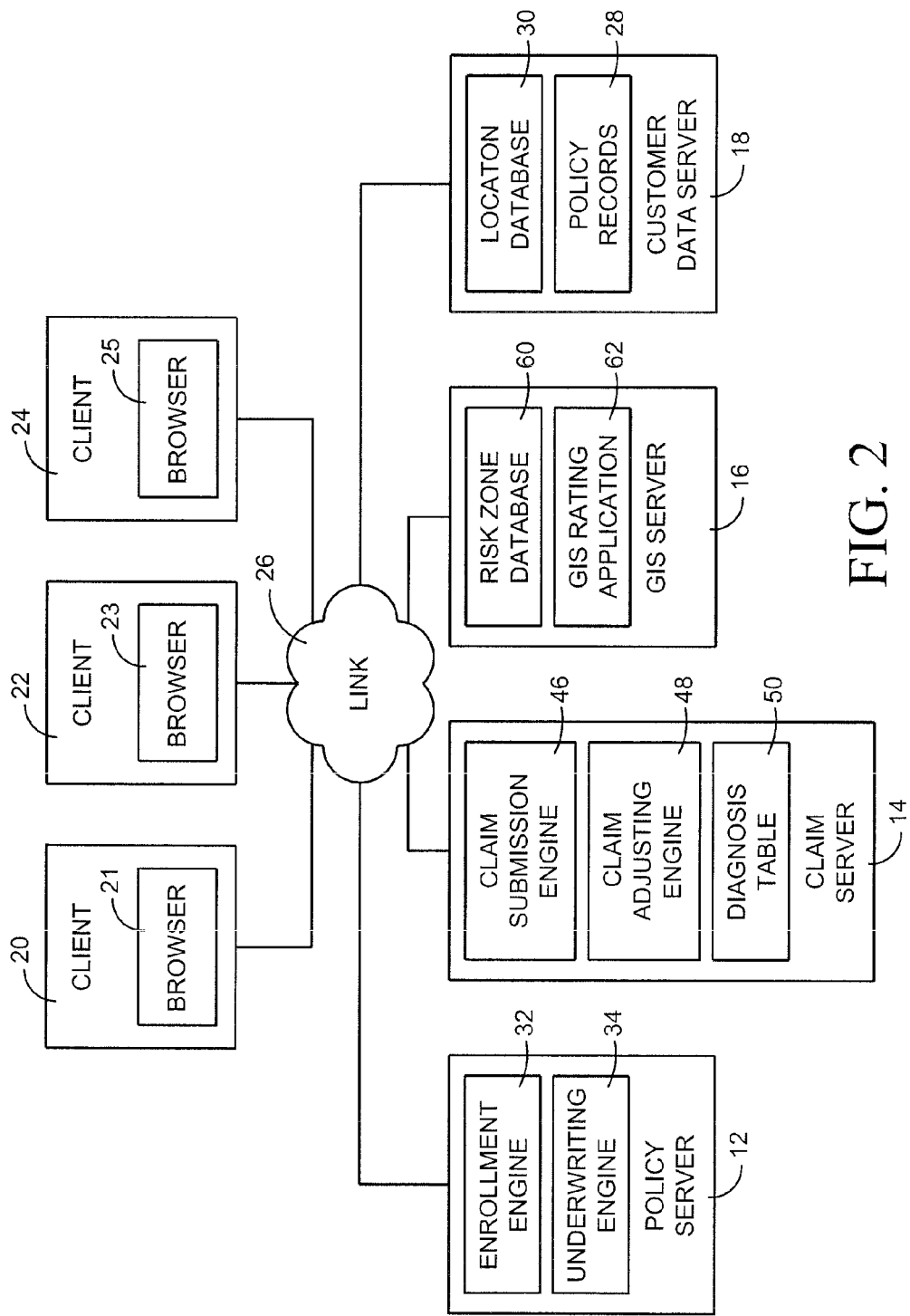
FIG. 2 is a block diagram illustrating various logical elements of the components of FIG. 1 according to an embodiment of the present invention.

Components:

FIG. 2 is an exemplary block diagram showing the logical components of server computers 12-18 and client computers 20-24. In this example, server computers 12-18 are labeled policy server 12, claim server 14, GIS server 16, and customer data server 18.

Each client computer 20, 22, and 24 is shown to include a browser 21, 23, and 25. Browsers 21, 23, and 25 represent generally any programming that, when executed by a respective client computer 20, 22, or 24, is capable of causing the display of one or more user interfaces through which a user can be informed and/or through which a user can supply information to one or more of server computers 12-18. Information provided to a user can include advertisements for pet health insurance, enrollment applications, claim submission forms, responses to enrollment applications and claim submissions as well as any other information related to pet health insurance.

As an example, client computer 20 may be accessed by a consumer—that is—a pet insurance policy holder or a person seeking to obtain a pet insurance policy. Client 22 may be accessed by an insurance underwriter or claims adjuster. Client computer 24 may accessed by a pet health provider or be given to a pet health provider to be accessed by the health provider's customers. While only three client computes are shown, network 10 may include any number of client computers. In one implementation, a client computer may be provided to each of any number of pet health care providers. Properly positioned in a provider's waiting room or examining room, the client computer can be used to advertise, to apply for a pet health insurance policy, and to submit a claim on an existing policy.

Customer data server 18 is shown to include policy records 28 and location database 30. Policy records 30 represents generally a collection of data records where each record contains data related to a particular insurance policy for pet health insurance. That data can include the name, address, and payment information of the policy holder, identifying information for the covered pet, and medical information for the pet. The medical information, for example, can identify pre-existing conditions identified during enrollment and any diagnoses and claims made during the policy's existence.

Location database 30 represents generally any collection of data identifying one or more physical locations. Data identifying a particular location might define a geographic point—a specific latitude and longitude for example. The data might instead define a particular area or a boundary of that area.

Policy server 12 is shown to include enrollment engine 32 and underwriting engine 34. Enrollment engine 32 represents generally any combination of hardware and/or programming capable of providing client devices 20-24 with an enrollment user interface enabling a user to specify one or more health conditions for a pet when enrolling for a pet insurance policy for that pet. As used, the term "user" means any individual. A user, for example, may be an insurance consumer, a pet health care provider, or even an insurance provider employer such as an underwriter or claims adjuster. The term health condition means information related to a prior diagnosis, injury, and/or treatment. Enrollment engine 32 is also responsible for receiving data entered through the an enrollment interface and for returning user interfaces containing data indicative of approved enrollment, declined enrollment, and the need for a manual review.

FIG. 3 illustrates an exemplary screen view of an enrollment user interface 36 provided by enrollment engine 32 and displayed by one of client computing devices 20-24. Enrollment user interface 36 includes controls 38-44. Controls 38 enable a user to provide personal information identifying the pet owner's name and address. Controls 40 enable the user to provide information concerning their pet's name, sex, species, breed, age, and other characteristics. Control 42, shown as a scroll box, enables a user to select one or more conditions that identify a past or current injury, diagnosis and/or treatment for a pet to be insured. Controls 44 enable a user to cause a client computing device 20-24 to submit data representing information entered using controls 38-42 back to enrollment engine 32.

Returning to FIG. 2, underwriting engine 34 represents generally any combination of hardware and/or programming capable of obtaining data entered through enrollment interface 32 and received by enrollment engine 32—that data representing one or more conditions. Underwriting engine 34 is responsible for electronically processing that data and to electronically flag each condition as a condition that is acceptable, precluded, or for manual review. As an example, underwriting engine 34 may have access to a database (not shown) of condition in which each condition is associated with a flag or with data that can be used to identify an appropriate flag base on one or more variables such as a pet's breed, sex, and/or age. A condition for one breed may call for an acceptable flag where the same condition for another breed may call for a precluded flag or a manual review flag. Accessing that database, underwriting engine 34 can then automatically identify or determine an appropriate flag for each of a number of conditions.

Where one or more conditions are flagged for declined enrollment, underwriting engine 34 instructs enrollment engine 32 to return a user interface containing information indicating declined enrollment. Where no conditions are flagged for declined enrollment but one or more conditions are flagged for manual review, underwriting engine 34 instructs enrollment engine 32 to return a user interface containing information indicating the need for manual review. A manual review flag indicates that an enrollment application should not be accepted or declined in an automated fashion. An ultimate determination is to be made after a more detailed review of items such as a pet's medical history obtained from a veterinarian.

Where all conditions are flagged as acceptable, underwriting engine 34 instructs enrollment engine 32 to return a user interface containing information indicating approved enrollment. Such an interface need not reflect actual approval. Instead it may simply indicate an eligibility for pet health insurance coverage subject to receipt of a completed application and payment or payment information such as an authorization to charge a specified credit card or other account.

Where a policy is created, underwriting engine 34 is responsible for causing a record associated with that policy to be added to policy records 28. at record may, for example, contain data representing an effective date for the policy as well as one or more health conditions, if any, specified through an enrollment interface provided by enrollment engine 32.

Claim server 14 is shown to include claim submission engine 46, claim adjusting engine 48, and diagnosis table 50. Claim submission engine 46 represents generally any combination of hardware and/or programming capable of providing client devices 20-24 with a claim submission interface having controls enabling a user to submit a claim with respect to an active policy for pet health insurance. Those controls enabling a user to specify a diagnosis for which coverage is claimed. The diagnosis may be for a pet's treatment that is to be performed or that has already been performed. Claim submission engine 46 is also responsible for receiving data entered through the claim submission interface and for returning user interfaces containing data indicative of claim approval, claim limitation, or the need for manual review.

FIG. 4 illustrates an exemplary screen view of a claim submission interface 52 provided by claim submission engine 46 and displayed by one of client computing devices 20-24. Claim submission interface 52 includes controls 54-58. Controls 54 enable a user to provide information identifying an active policy for pet health insurance, a date of a claim, and a dollar amount. Controls 56, shown as a scroll box, enables a user to select one or more conditions that identify a diagnosis for which coverage is being claimed under the identified policy. Controls 58 enable a user to cause a client computing device 20-24 to submit data representing information entered using controls 38-42 back to claim submission engine 46.

Returning to FIG. 2, claim adjusting engine 48 represents generally any combination of hardware and/or programming capable of obtaining the claim data entered through claim submission interface 52 and received by enrollment engine 32—that claim data representing a claim date and a diagnosis. Claim adjusting engine 48 is responsible for obtaining the record associated with the identified policy from customer data server 18 and electronically process the claim data with the associated record in order to electronically flag the diagnosis as limited, covered, or for manual review.

To reiterate, the claim data entered through the claim submission user interface includes data identifying a policy, a diagnosis, and a claim date. The record associated with the identified policy contains data identifying an effective date of the policy and one or more conditions submitted to policy server 12 via an enrollment user interface. Claims adjusting engine 48 flags a diagnosis as limited where a comparison of the identified diagnosis with the identified conditions from the policy record reveals that the diagnosis is related to one or more conditions identified by the policy record.

Where a diagnosis is not flagged as limited, claim adjusting engine 48 determines if the diagnosis is for a suspect condition. If the diagnosis is determined to be non-suspect, claim adjusting engine 48 flags the diagnosis as covered. If the diagnosis is determined to be suspect, claim adjusting engine 48 flags the diagnosis for manual review. A suspect diagnosis is one in which a duration between an effective date of the policy and the claim date does not exceed a predetermined duration. The predetermined duration may be dependent upon the diagnosis as well as one or more other factors such as pet breed, age and sex. A diagnosis for cancer may call for a longer predetermined duration than a diagnosis for a laceration. Claims adjusting engine 48 is responsible for comparing a predetermined duration for an identified diagnosis with a difference between an effective date of a policy and a claim date. Where the predetermined duration exceeds the difference, the identified diagnosis is suspect. Otherwise, it is not.

Where the identified diagnosis is flagged as limited, claim adjusting engine 48 instructs claim submission engine 46 to return a user interface containing information indicating claim limitation. As will be discussed below, claim limitation indicates that there is a specified dollar limit of coverage with respect to the diagnosis rather than exclusion to coverage for a pre-existing condition. Where the identified diagnosis is flagged for manual review, claim adjusting engine 48 instructs claim submission engine 46 to return a user interface containing information indicating the need for manual review.

Where the identified diagnosis is flagged approved, claim adjusting engine 48 instructs claim submission engine 46 to return a user interface containing information indicating claim approval. Such an interface need not reflect actual claim approval. Instead it may simply indicate an eligibility for approval pending submission of a paid receipt or other proof of loss.

Diagnosis table 50 represents generally a collection of data used by claim adjusting engine 48 to determine whether or not a diagnosis is suspect. As an example, diagnosis table 50 may include a series of entries with each entry identifying a diagnosis and a predetermined duration for that diagnosis. In performing its task of determining if an identified diagnosis is suspect, claim adjusting engine 48 then can determine a predetermined duration for the identified diagnosis by examining an entry from diagnosis table 50 for the identified diagnosis.

GIS server 16 is shown to include risk zone database 60 and GIS rating application 62. Risk zone database 60 represents generally any collection of geographic data that identifies any number of risk zones of varying types. Risk zone database 60 defines geographic risk zones pertaining to particular risks that can affect an insurance rating for a pet health insurance policy. As examples, the risk pertaining to a given risk zone can be any potential hazard such as a proximity to a highway, a national forest, a nuclear power plant, a volcano, or even a flood zone.

A risk zone is a geographic area in which it has been determined that a particular risk is more or less likely than in a neighboring geographic area. For example, in a geographic area defining an interstate highway, vehicle accidents are more likely to occur than in a geographic area immediately adjacent to the interstate. Floods are more likely to occur in geographic areas adjacent to waterways. Forest fires are more likely to occur in geographic areas that border national forests. Data identifying a particular geographic risk zone might define a particular area or a boundary of that area.

An example of a risk zone database 60 is described with reference to FIG. 5. Risk zone database 60 includes a plurality of entries 64. Each entry 64 contains data in four fields 66-72. These fields are labeled zone ID 66, risk type 68, risk score 70, and zone boundary 72. Each entry 64 is associated with and identifies a particular risk zone. Data in field 66 identifies the particular entry 64. Data in field 68 of a given entry 40 identifies a particular type of risk corresponding to the risk zone identified by that entry 64.

Data in field 70 of an entry 64 identifies a risk score for the risk zone identified by that entry 64. A risk score is data corresponding to the severity of a risk type for a particular risk zone. As an example, for a given risk zone a score may in some manner indicate that the particular risk is somewhat likely, likely, or very likely. As will be described below, the score for a risk zone is used in determining an insurance rating when it is determined that a given location falls within that risk zone.

Data in field 72 of an entry 64 defines a geographic boundary for the risk zone identified with that entry 64. A geographic boundary can be defined in at least two ways. A boundary can be identified as a polygon defined by the coordinates of the end points of each line segment of the polygon. A boundary can also be a circumference defined by the coordinates of a center point and a radius. Examples of these are described below with reference to FIG. 6.

Figure 6:
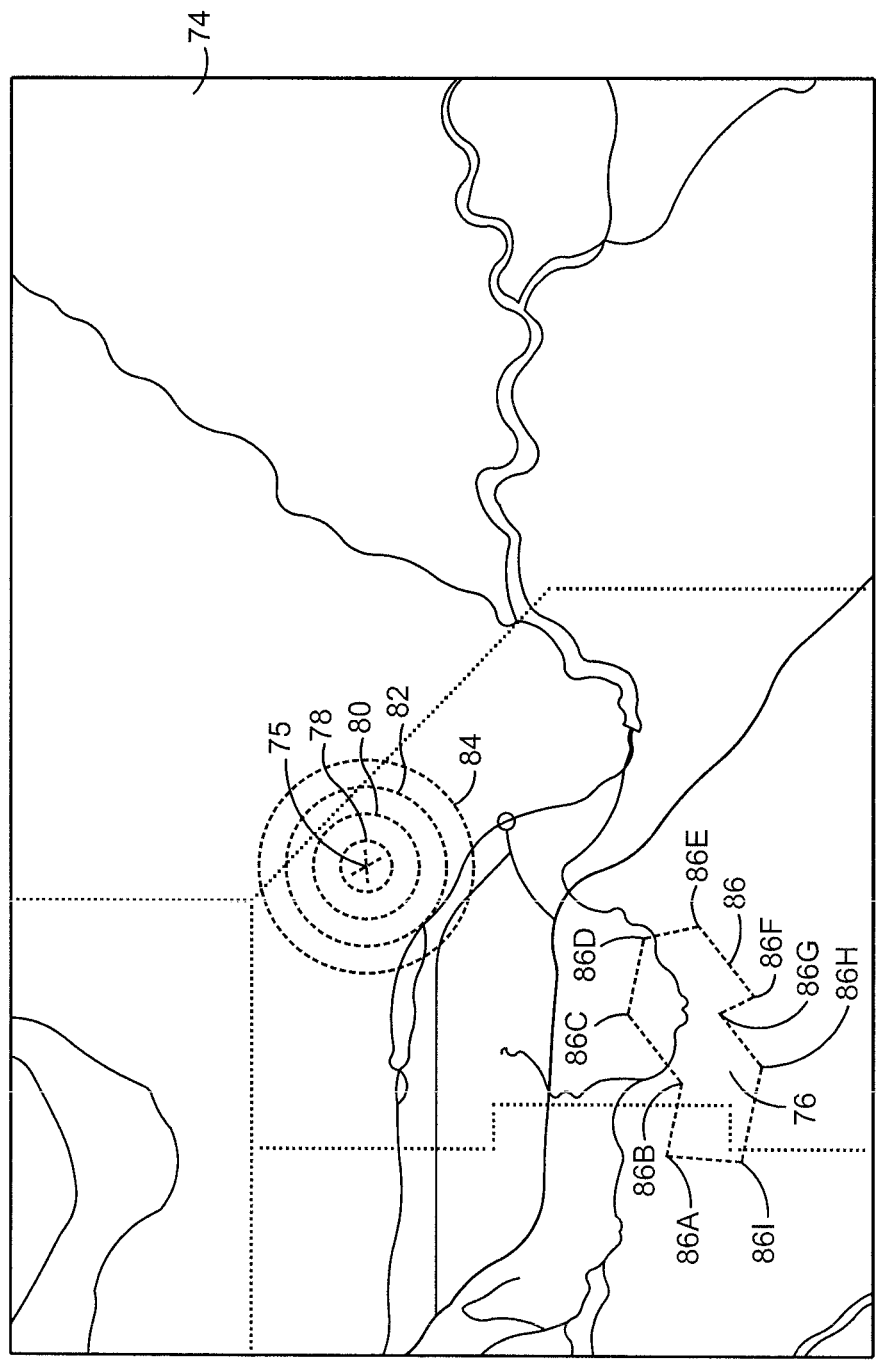
FIG. 6 illustrates risk zone boundaries layered over a map according to an embodiment of the present invention.

FIG. 6 illustrates a map 74. Layered over map 74 are risk zones 76-84. Risk zone 76 has a boundary 86 in the form of a polygon defined by coordinates 86A-86I. Risk zones 78-84 each have a boundary in the form of a circumference defined by coordinates 75 and a given radius.

Figures 5, 7, 8:
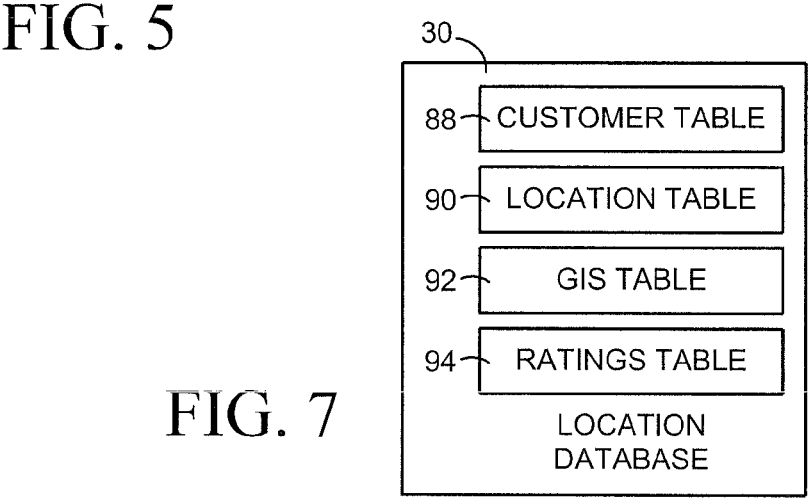
FIG. 5 illustrates the logical components of a risk zone database according to an embodiment of the present invention.
FIG. 7 illustrates the logical components of a location database according to an embodiment of the present invention.
FIG. 8 illustrates the structure of a customer table according to an embodiment of the present invention.

Moving to FIG. 7, location database 14 is shown to include customer table 88, location table 90, GIS (Geographic Information System) table 92, and ratings table 94. Customer table 88 represents generally a collection of data identifying one or more customers. Location table 90 represents generally a collection of data corresponding to one or more locations—with each location being associated with a customer identified in customer table 88. GIS table 92 represents generally a collection of data identifying coordinates. Various groupings of those coordinates can identify a location. Each such grouping is associated with data corresponding to that location in location table 90. By identifying a customer in customer table 88, one or more locations associated with that customer can be identified in location table 90. Coordinates defining a given location can then be obtained from GIS table 92. Examples of tables 88-92 are described below with reference to FIGS. 8-10.

Ratings table 94 represents generally any collection of data that can be used when calculating an insurance rating relating in some fashion to the proximity of a given location to one or more geographic risk zones. An example of a ratings table is described below with reference to FIG. 13.

FIG. 8. illustrates an exemplary structure of customer table 88 from FIG. 7. Customer table 88 includes entries 96. Each entry 96 is associated with a particular customer and includes data in customer ID field 98 and data in profile field 100. Data in customer ID field 98 of an entry 96 uniquely identifies that entry 96. Data in profile field 100 of an entry 96 in some manner identifies or is otherwise related to a customer. For example data in profile field 100 may include a name and an address.

FIG. 9 illustrates an exemplary structure of location table 90 from FIG. 7. Location table 90 includes entries 102. Each entry 102 is associated with a particular location and includes data in location ID field 104, address field 106, and customer ID field 108. Data in location ID field 104 of an entry 102 uniquely identifies that entry 102. Data in address field 104 of an entry 102 includes an address of the location associated with that entry 106. Data in customer ID field 108 of an entry 102 identifies an entry 96 in customer table 88 of FIG. 8 and, thus, associates a location with a particular customer. It is noted that two or more entries 102 and corresponding locations in location table 90 may be associated with a single customer.

FIG. 10 illustrates an exemplary structure of GIS table 92 from FIG. 7. GIS table 92 includes entries 110. Each entry 110 includes data in GIS ID field 112, coordinates field 114, and location ID field 116. Data in GIS ID field 112 of an entry 110 uniquely identifies that entry 110. Data in coordinates field 114 of an entry 110 identify a geographic point. For example, the data might identify a specific latitude and longitude. Data in location ID field 116 of an entry 110 identifies an entry 102 in location table 90 of FIG. 9 and, thus, assigns a geographic point to a particular location. A given location might be defined by a single geographic point. In such a case, a single entry 110 in GIS table 92 identifying that point will be assigned to an entry 102 in location table 90. Another location might be defined by a polygon shaped geographic boundary. Such a boundary can be defined by line segments connecting three or more geographic points. In this case, three or more entries 110, each defining one of those geographic points, will be assigned to an entry 102 in location table 90.

Figure 11:
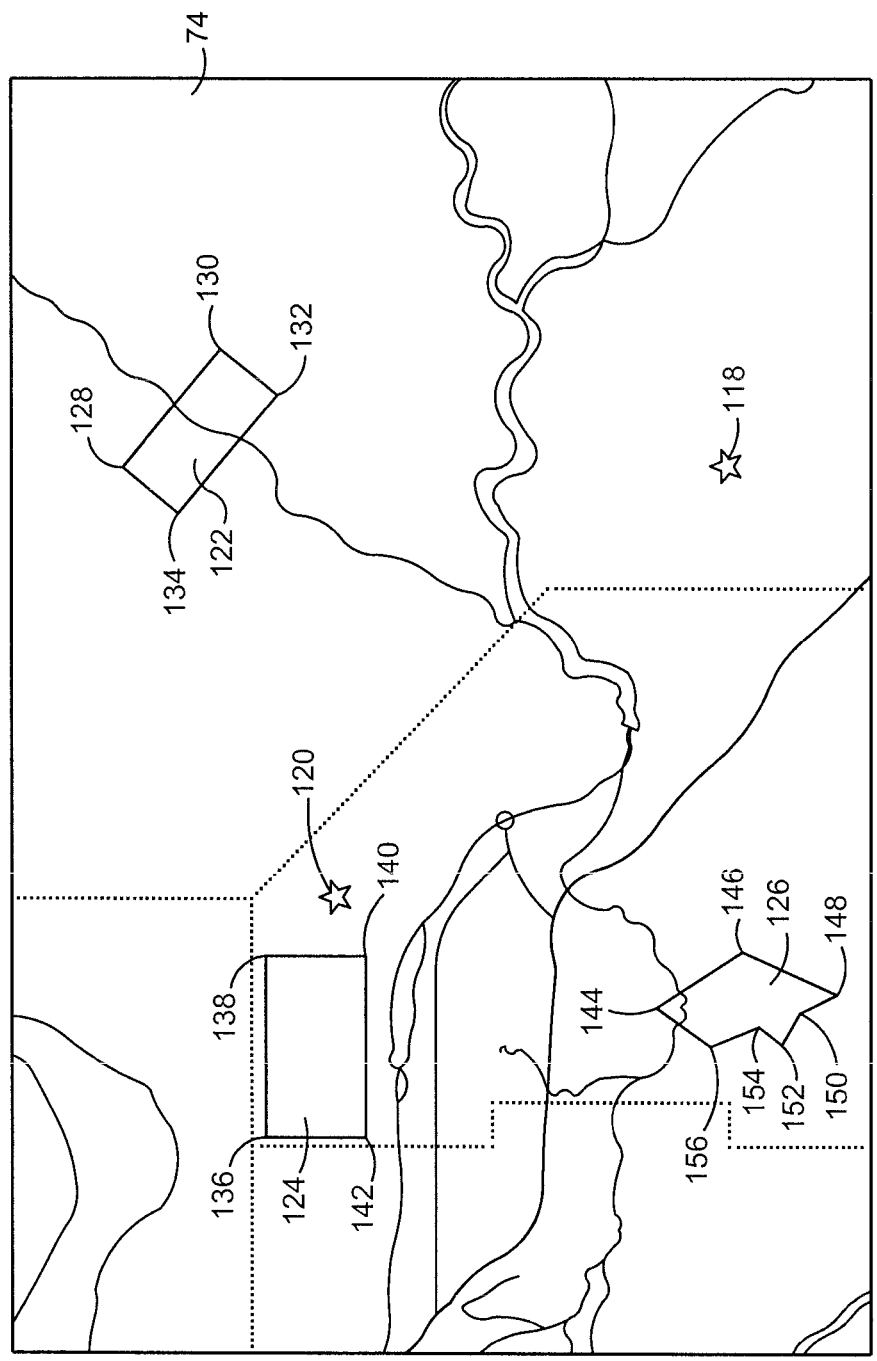
FIG. 11 illustrates the map of FIG. 6 over which location boundaries are layered according to an embodiment of the present invention.

FIG. 11 helps illustrate an example of how tables 88-92 of FIGS. 8-10 can be used to define locations. FIG. 11 illustrates map 74 from FIG. 6. Shown layered over map 74 are locations 118-126. Locations 118 and 120 are each defined by a single geographic point represented by a star. Referring back to FIG. 9, location table 90 will include separate entries 102 for locations 118 and 120. Those entries 102 may be associated with the same customer or different customers in customer table 88 of FIG. 8. Referring to FIGS. 9 and 10, GIS table 92 will include an entry 110 defining the geographic point for location 118. That entry 110 will have data in location ID field 116 identifying the entry 102 in location table 90 for location 118. Similarly, GIS table 92 will include another entry 110 defining the geographic point for location 120. That entry 110 will have data in location ID field 116 identifying the entry 102 in location table 90 for location 120.

Still referring to FIG. 10, locations 122-126 are each defined by a geographic boundary in the shape of a polygon. Referring back to FIG. 9, location table 90 will include separate entries 102 for locations 122-126. Those entries 102 may be associated with the same customer or different customers in customer table 88 of FIG. 8. Location 122 is a rectangular area defined by a geographic boundary. That boundary is identified by four line segments connected at geographic points 128-134. Referring to FIGS. 9 and 10, GIS table 92 will include another four entries 110 each associated with the entry 102 in location table 90 for location 122. Each of the four entries 110 will define a different geographic point 128, 130, 132, or 134.

Location 124 is also a rectangular area defined by a geographic boundary. That boundary is identified by four line segments connected at geographic points 136-142. Referring to FIGS. 9 and 10, GIS table 92 will include another four entries 110 each associated with the entry 102 in location table 90 for location 124. Each of the four entries 110 will define a different geographic point 136, 138, 140, or 142.

Location 126 is an irregular area defined by a geographic boundary. That boundary is identified by seven line segments connected at geographic points 144-156. Referring to FIGS. 9 and 10, GIS table 92 will include another seven entries 110 each associated with the entry 102 in location table 90 for location 126. Each of the seven entries 110 will define a different geographic point 144, 146, 148, 150, 152, 154, or 156.

Figure 12:
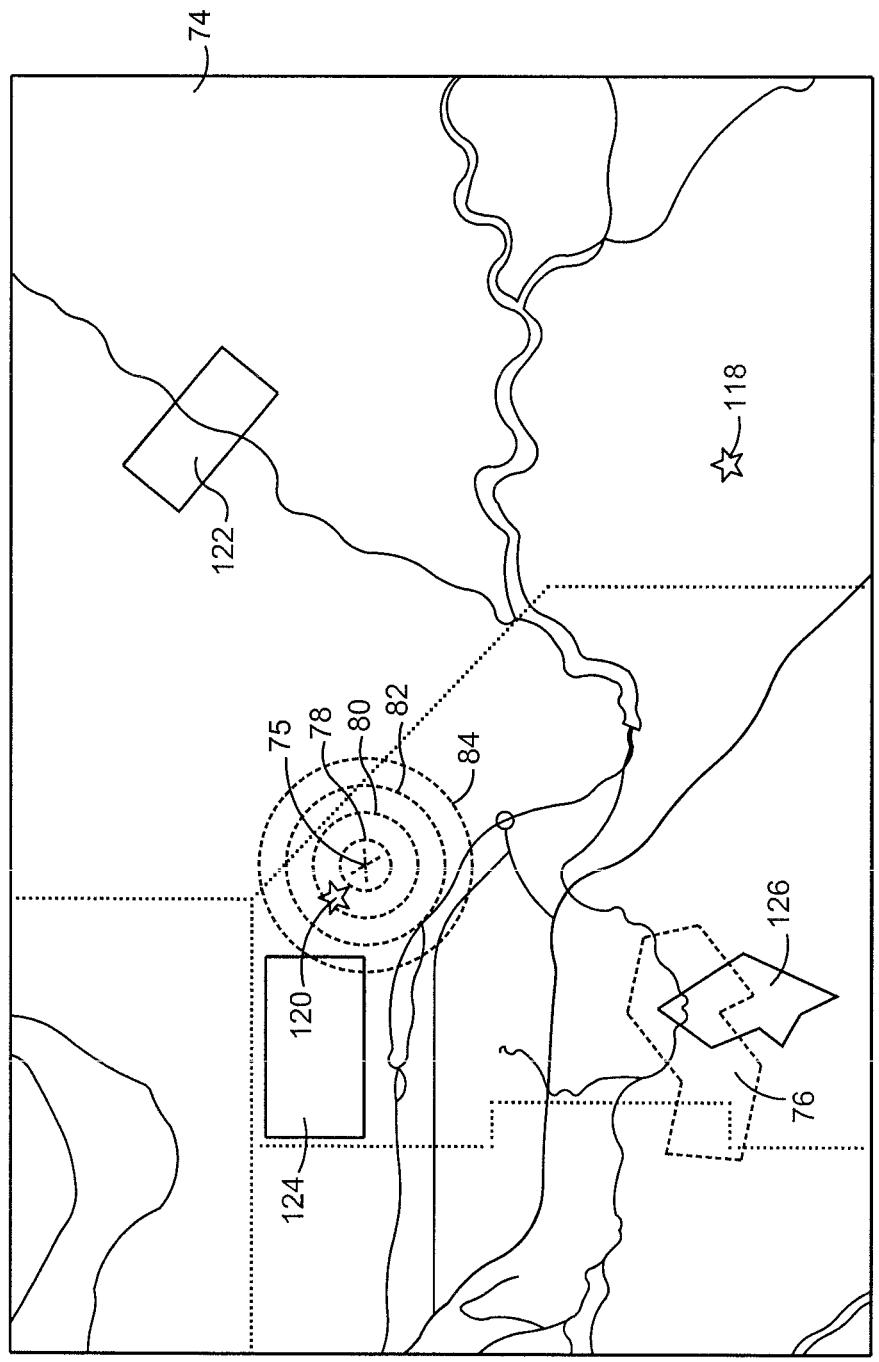
FIG. 12 illustrates the map of FIG. 6 over which location boundaries and risk zone boundaries are layered according to an embodiment of the present invention.

FIG. 12 illustrates geographic risk zones 76-84 and locations 118-126 layered over map 74. A visual inspection reveals that locations 118 and 122 are not located within a geographic risk zone. Location 120 is located within risk zones 80, 82, and 84. A portion of location 124 is located within risk zone 84. A portion of location 126 is located within risk zone 76.

Figures 13, 14:
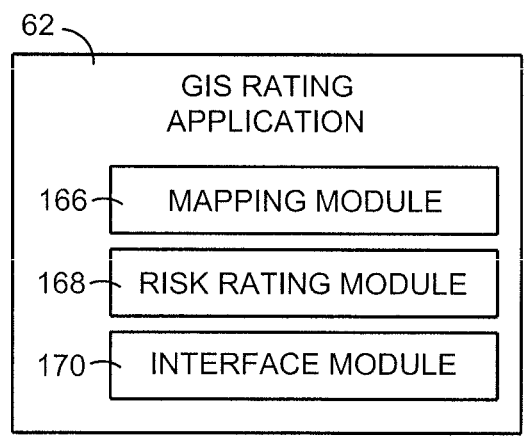
FIG. 13 illustrates the structure of a ratings table according to an embodiment of the present invention.
FIG. 14 illustrates the logical components of a GIS rating application according to an embodiment of the present invention.

FIG. 13 illustrates an exemplary structure of ratings table 94 from FIG. 7. Ratings table 94 includes entries 158. Each entry 158 is associated with a particular type of risk that may be insured against (particular diagnosis that may be covered under a pat health insurance policy) and includes data in risk ID field 160, risk type field 1620, and base rating field 164. Data in risk ID field 160 of an entry 158 uniquely identifies that entry 158. Data in risk type field 162 of an entry 158 identifies the particular risk associated with that entry 158. Data in base rating field 164 of an entry 158 identifies a base rating for the risk type associated with that entry 158.

Referring back to risk zone database 60 shown in FIG. 5, data in risk type field 68 of entries 64 correspond to data in risk type field 162 of entries 158 of ratings table 94. A given entry 64 in risk zone database 60 defines a given geographic risk zone for a risk type identified by risk type field 68 for that entry 64. A base rating for that risk type can be identified by locating an entry 158 in ratings table 94 associated with that same risk type.

FIG. 14 is an exemplary block diagram illustrating logical program elements of GIS rating application 62 from FIG. 2. As shown, GIS rating application 62 includes mapping module 166, risk rating module 168, and interface module 170. Mapping module 166 represents generally any program capable of comparing a location to a geographic risk zone to determine if the location falls within the geographic risk zone. In doing so, mapping module 166 can obtain data defining the location using location table 90 and GIS table 92 (FIG. 7). This data may itself define, or be of use in defining, a geographic point or a boundary of a location. The data, for example, may include the coordinates of the geographic point or the coordinates of the endpoints of line segments that define the location boundary. Data identifying the geographic risk zone can be obtained from geographic risk zone database 60 (FIG. 2). Again, this data may itself define, or be of use in defining, a boundary of a location. The data, for example, may include the coordinates of the endpoints of line segments that define the risk zone boundary.

To determine if a location is located within a geographic risk zone, mapping module 166 may determine if the location such as a geographic point falls entirely within the geographic boundary of the risk zone. Where the location is defined by a boundary, mapping module 166 compares that boundary to the boundary of the risk zone to determine if at least a portion of the geographic area bounded by the location boundary is also bounded by the boundary of the geographic risk zone. This can be accomplished, for example, by determining if the location boundary intersects or is contained entirely within the boundary of the geographic risk zone.

Risk rating module 168 represents generally any program capable of obtaining and using a score associated with a geographic risk zone to calculate an insurance rating related in some manner to a particular location. As an example, mapping module 166 may determine that a particular location falls within a given geographic risk zone. Referring to FIG. 5, accessing risk zone database 60, ratings module 168 can obtain a score and data identifying the type of risk in question from an entry 64 associated with that geographic risk zone. Risk rating module 168 can then obtain a base rating for that risk type from ratings table 94 shown in FIG. 13 and then calculate an insurance rating using the obtained score and base rating.

For example, the base rating for a cancer risk may be a five. The particular value of the score may only be relevant when compared to base scores for other risk types. Continuing with the example, a score for a given cancer risk zone may be: (1) 0.5 indicating that the risk of cancer occurrence is somewhat likely over a given period; (2) 1.0 indicating that the risk of cancer occurrence is likely over that same period; or (3) 1.5 indicating that the risk of cancer occurrence is highly likely. The score can be multiplied with the base rating when calculating the insurance rating for a location for the given risk. It is noted that other variables may also be used to calculate a rating.

Still referring to FIG. 14, interface module 170 represents generally any program capable of generating and/or presenting an interface having user accessible controls for use in identifying a location. Such an interface may include controls for entering or identifying an address or other coordinates associated with a location.

Figure 15:
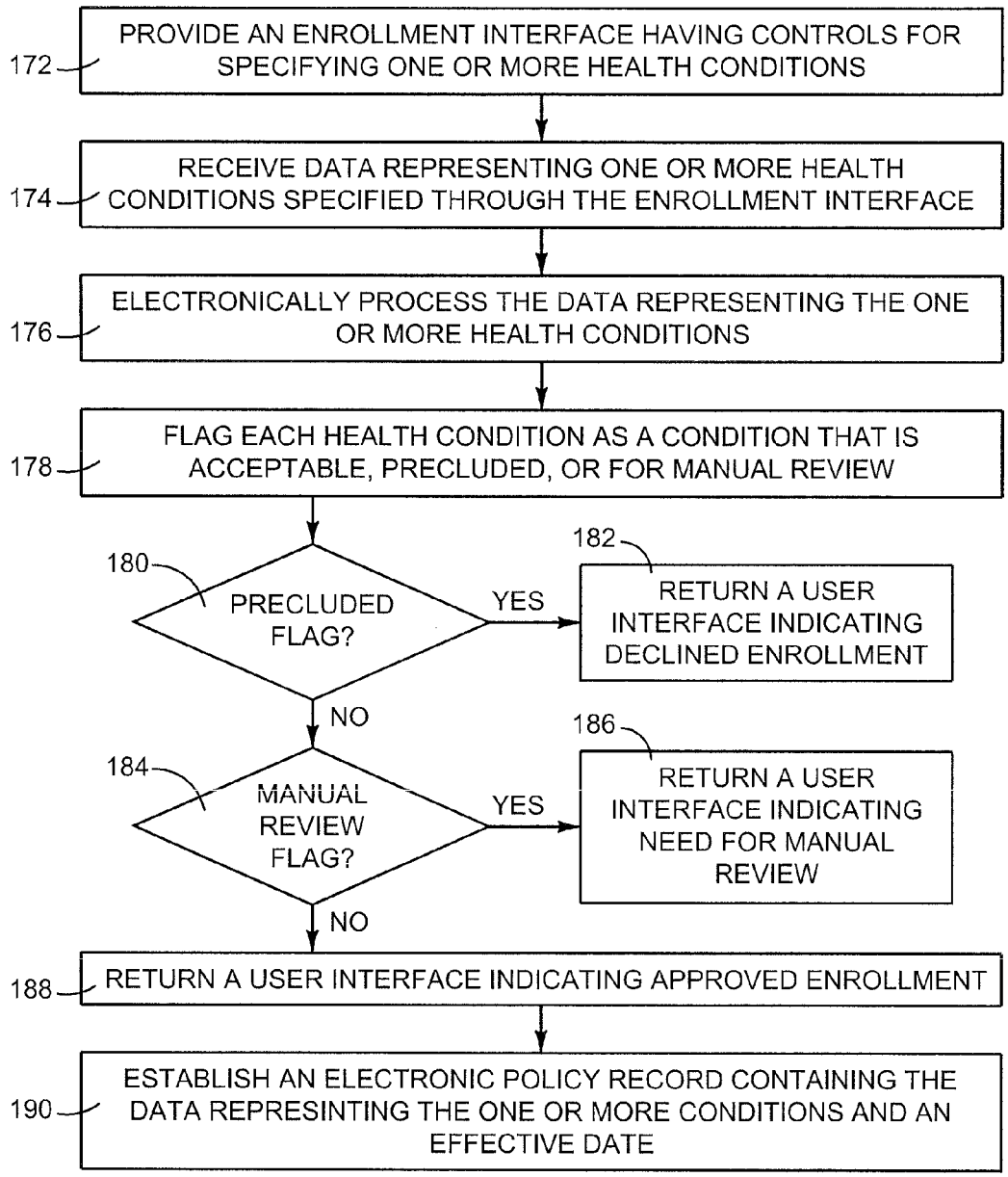
FIG. 15 is an exemplary flow diagram illustrating an enrollment and underwriting method according to an embodiment of the present invention.

Enrollment and Underwriting Methodology:

FIG. 15 is an exemplary flow diagram that helps illustrate steps taken during an enrollment and underwriting procedure. Initially, an enrollment interface is provided (step 172). The enrollment interface has one or more controls for specifying one or more health conditions. See enrollment interface 36 of FIG. 3 for an example. Data representing one or more health conditions specified through the enrollment interface is received (step 174). The data received in step 174 is processed (step 176) so that each health condition can be flagged as a condition that is acceptable, precluded, or for manual review (step 178).

An acceptable condition is one that will allow for an automated approval for enrollment. A precluded condition is one that calls for an automated denial of enrollment. A condition flagged for manual review is a condition that requires a manual review of an enrollment application and medical history to determine whether to approve or deny enrollment.

It is next determined if any condition has been flagged as precluded (step 180). If a precluded flag exists, a user interface indicating declined enrollment is returned (step 182). Otherwise, it is determined if any condition has been flagged for manual review (step 184). If a manual review flag exists, an interface indicating the need for manual review is returned (step 186).

Otherwise, an interface indicating approved enrollment is returned (step 188). An electronic policy record is created (step 190). The record contains the data representing the one or more conditions received in step 174 as well as an effective date for the policy (step 190).

Figure 16:
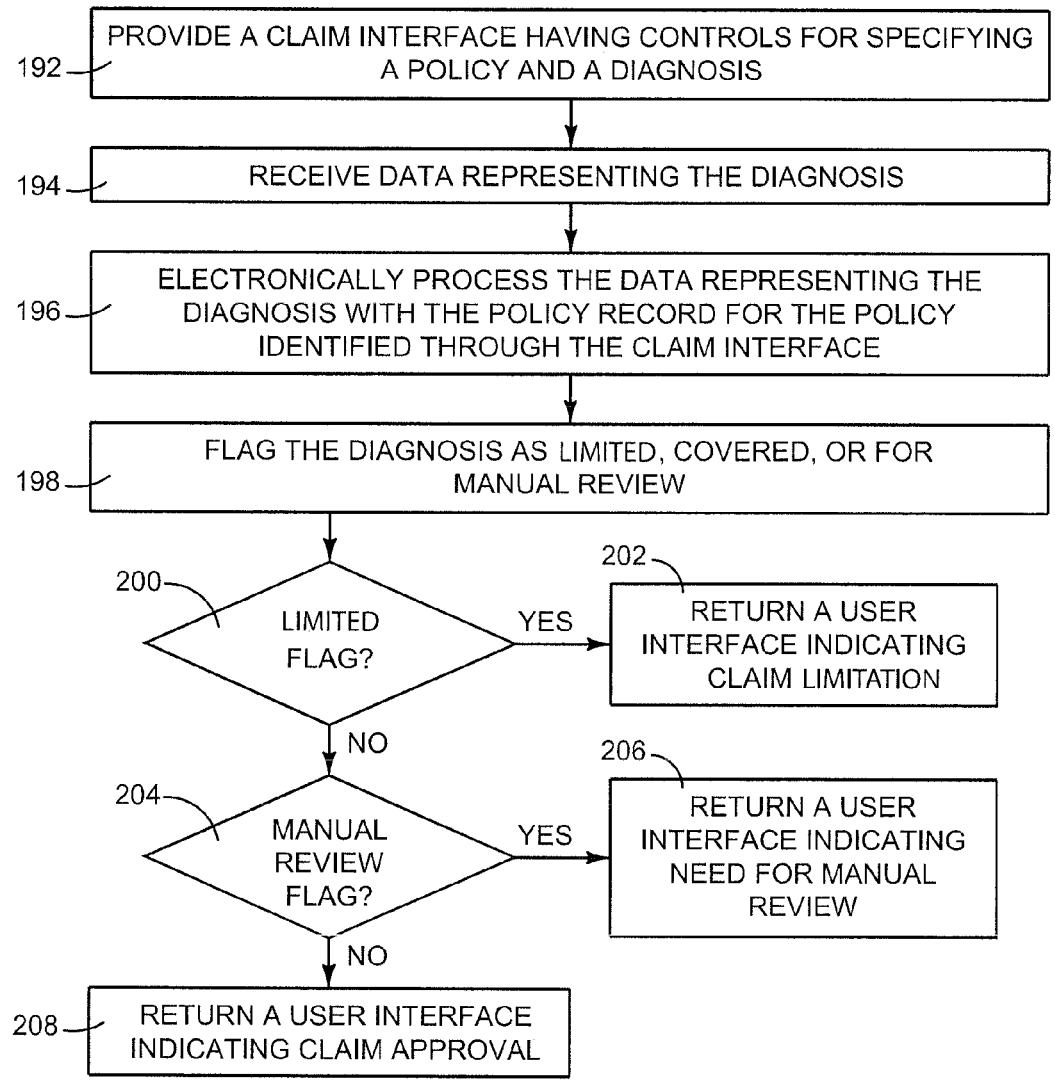
FIG. 16 is an exemplary flow diagram illustrating a claim submission and adjusting method according to an embodiment of the present invention.

Claim Adjusting Methodology:

FIG. 16 is an exemplary flow diagram that helps illustrate steps taken during a claim adjusting procedure. Initially a claim submission interface is provided (step 192). The claim submission interface has one or more controls for specifying a policy and a diagnosis. See claim submission interface 52 of FIG. 4 for an example. Data, entered through the claim submission interface representing a policy and a diagnosis are received (step 194). The data representing the diagnosis is electronically processed with the policy record for the policy identified through the claim submission interface (step 196) so that the diagnosis can be flagged as limited, covered, or for manual review (step 198).

A diagnosis flagged as limited relates to a health condition that existed prior to the effective date of the policy. A covered diagnosis relates to a health condition that is not pre-existing and for which coverage can be approved in an automated fashion without manual review. A diagnosis flagged for manual review relates to a suspect condition that may be pre-existing and would benefit from a manual review of the claim and health records related to the diagnosis. Examples for implementing step 198 are provided below with references to the flow diagrams of FIGS. 17 and 18.

Continuing with FIG. 16, it is determined if the diagnosis is flagged as limited (step 200). If limited, a user interface indicating claim limitation is returned (step 202). Otherwise, it is determined If the diagnosis is flagged for manual review (step 204). If flagged for manual review, a user interface indicating the need for manual review is returned (step 206). Otherwise, a user interface indicating claim approval is returned (step 208). It is noted that a diagnosis flagged as limited and a diagnosis flagged for approval may both be approved and coverage for both may be limited to a specified dollar limit of coverage.

Figure 17:
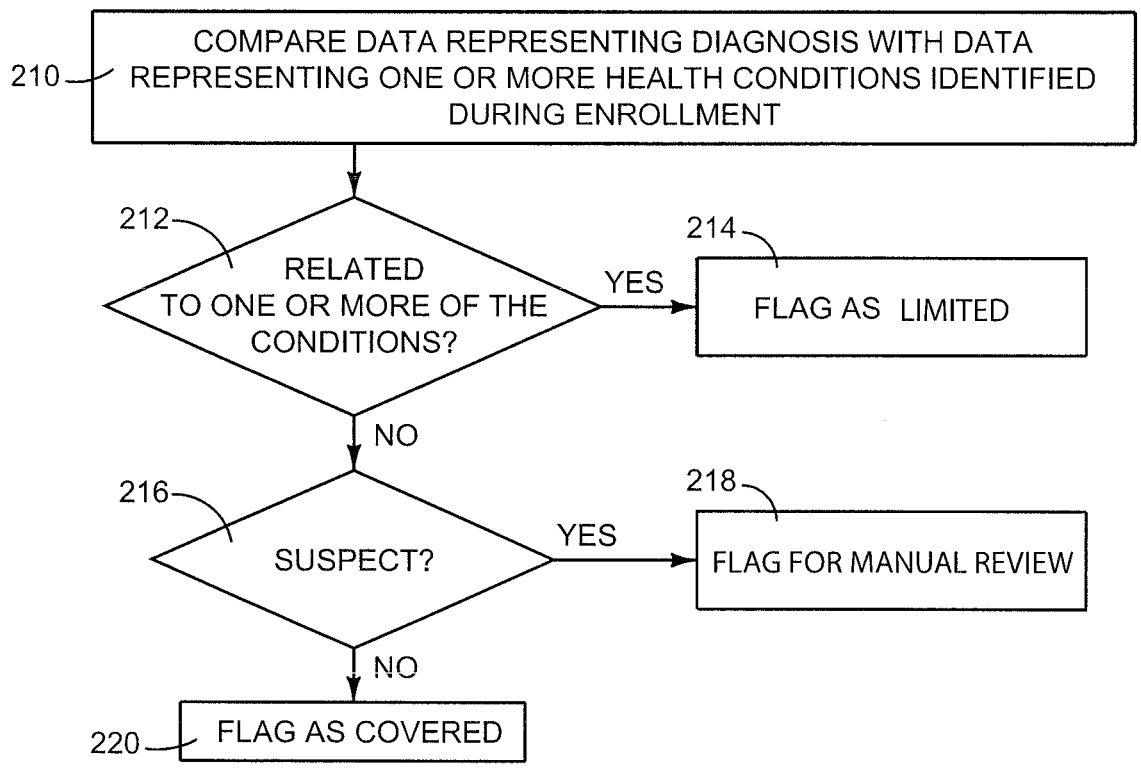
FIG. 17 is an exemplary flow diagram illustrating steps taken to flag a diagnosis according to an embodiment of the present invention.
Figure 18:
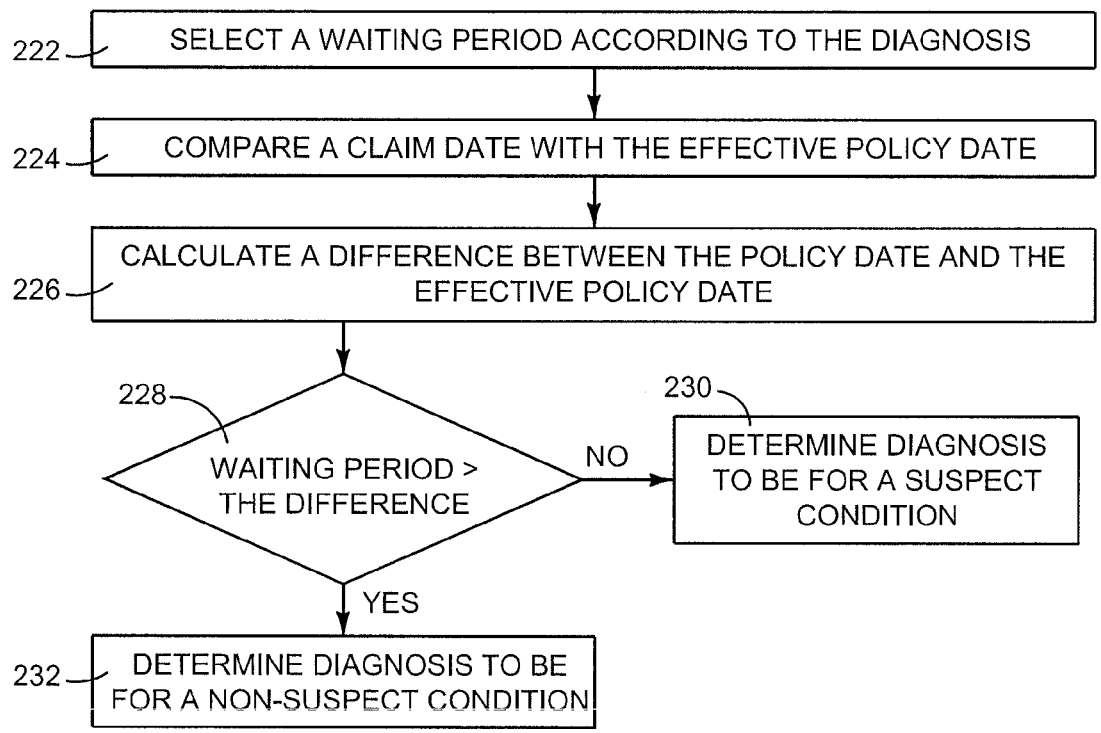
FIG. 18 is an exemplary flow diagram illustrating steps taken to determine whether a diagnosis is suspect according to an embodiment of the present invention.

FIGS. 17 and 18 are exemplary flow diagrams that helps illustrate steps taken to flag a diagnosis as limited, covered, or for manual review. Starting with FIG. 17, data representing the diagnosis is compared with data representing one or more conditions specified during enrollment and the effective date for the policy in question (step 210). It is determined if the data representing the diagnosis is related to one or more of those conditions (step 212). If related, the diagnosis is flagged as limited (step 214). Otherwise, it is determined if the diagnosis is for a suspect condition (step 216). If suspect, the diagnosis is flagged for manual review (step 218). Otherwise the diagnosis is flagged as covered (step 220). A suspect condition is a condition that may be pre-existing can benefit from a manual review.

FIG. 18 is an exemplary flow diagram that helps illustrate steps taken to determine if a diagnosis is for a suspect condition. Initially, a waiting period is selected according to the diagnosis (step 222). Using a database such as diagnosis table 50 of FIG. 2, different diagnoses can electronically associated with different waiting periods. For example, a diagnosis involving cancer may be associated with a longer waiting period than a diagnosis involving a laceration. A claim date is then compared with the effective policy date (step 224). A difference between the claim date and the policy date is calculated (step 226).

Next it is determined if the selected waiting period exceeds the duration calculated in step 226. If it does, the diagnosis is determined to be for a suspect condition (step 230). If it does not, the diagnosis is determined to be for a non-suspect condition (step 232).

Figure 19:
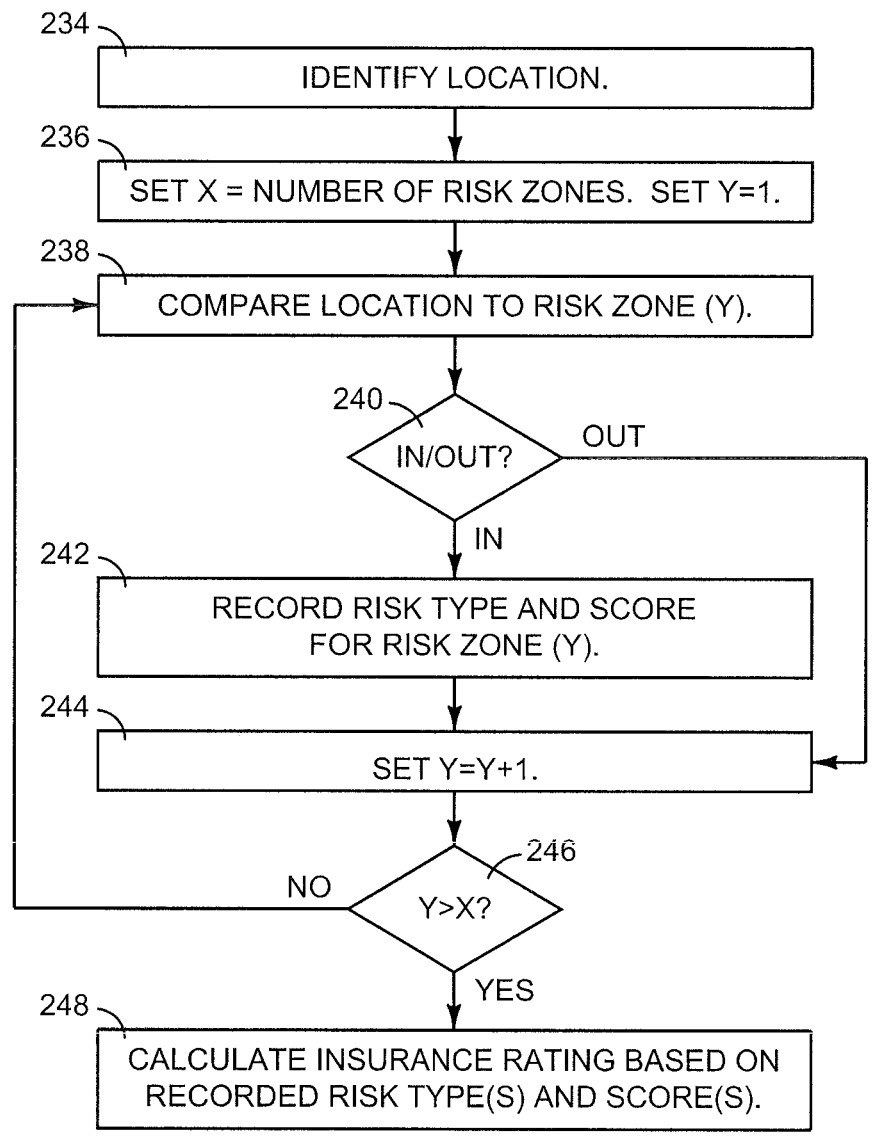
FIG. 19 is an exemplary flow diagram illustrating steps taken to determine a geographic insurance rating according to an embodiment of the present invention.

Rating Methodology:

FIG. 19 is an exemplary flow diagram that helps illustrate steps taken to calculate an insurance rating. Initially, a location is identified (step 234). The location may be defined by a geographic point or boundary. A variable X is set to equal the number of risk zones and a variable Y is set to equal one (step 236). Referring back to FIG. 5, the number of risk zones may, for example, correspond to the number of entries 64 in risk zone database 60.

The location identified in step 234 is compared to risk zone (Y) (step 238). Then it is determined if the location falls (at least partially) within risk zone (Y) (step 240). Steps 238 and 240, for example may be performed by mapping module 166 (FIG. 14). If the location lies outside of risk zone (Y), the process skips to step 244. Otherwise the risk type and score for risk zone (Y) are recorded (step 242). The variable Y is incremented by one (step 244), and it is determined if the value of Y exceeds the value of X (step 246). If it does not, the process repeats with step 238.

If the value of Y exceeds X then the process continues, and an insurance rating is calculated (step 248) based on each risk type and score recorded in step 242. Steps 242 and 248, for example, may be performed by risk rating module 168 (FIG. 14). For a given risk zone (Y), risk rating module 168 can obtain data identifying the risk type as well as a score for the risk zone and record those values in step 242. Using the recoded values, risk rating module 168 can obtain a base rating for each identified risk type and calculate an insurance rating using the base ratings and the recorded scores.

Figure 20:
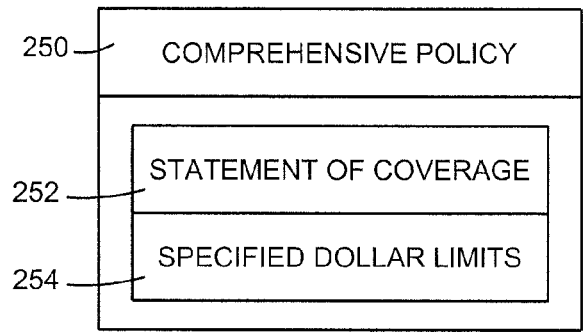
FIG. 20 is a schematic description of a comprehensive insurance policy according to an embodiment of the invention.

Packaging Methodology:

Referring now to the FIGS. 20 and 21, a new business model for the insurance industry will be described in detail. Referring first to FIG. 20, protection against a wide range of diagnoses is packaged into a single comprehensive policy 250. Policy 250 includes a statement of coverage 252 and specified dollar limits 254. Specified dollar limits 254 identify, for each diagnoses covered under the statement of coverage 252, a dollar limit of coverage.

When applying for coverage, a customer may identify pre-existing health conditions for a pet. As long as none of those conditions exclude coverage altogether, the application may be approved. Instead of exclusions to coverage for those pre-existing conditions, the resulting policy will include limitations with respect to those pre-existing condition. In other words there will be a specified dollar limit of coverage for diagnoses related to a pre-existing condition instead of an exclusion.

Figure 21:
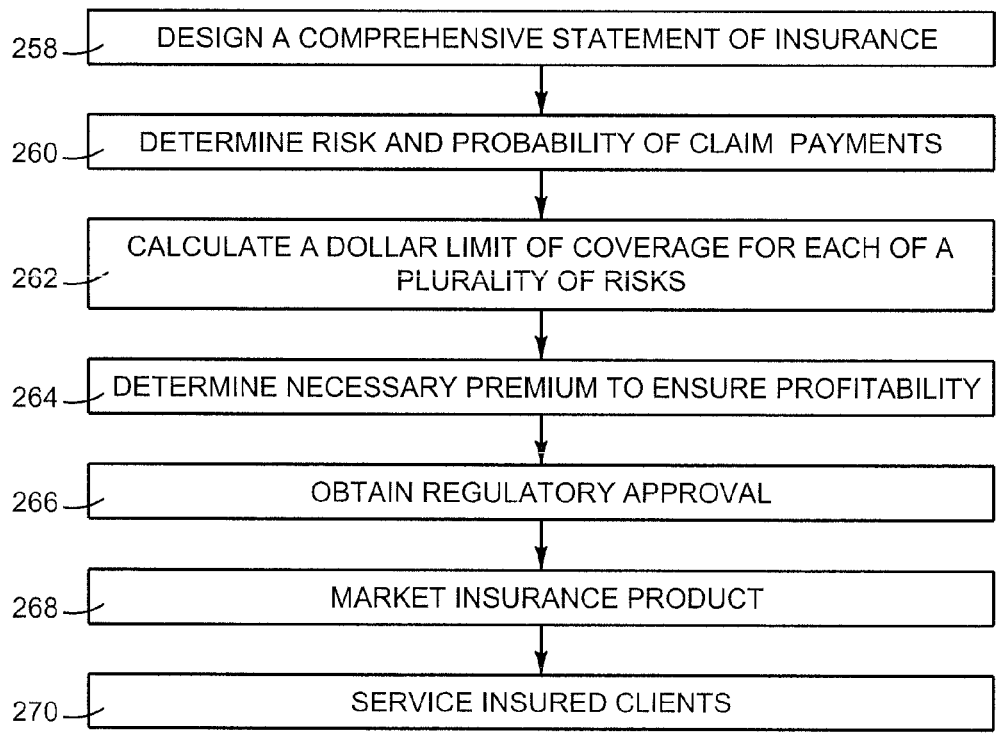
FIG. 21 is an exemplary flow diagram including method steps for packaging a comprehensive insurance policy according to an embodiment of the present invention.

Referring now to FIG. 21, by replacing exclusions to coverage with specified dollar limits of coverage, the business model 256 (FIG. 21) eliminates the inherent ambiguity of the traditional model in which individual and distinct insurance policies are bundled. Under the new model 256, all diagnoses can be covered under a statement of coverage 252 designed in step 258. A risk and probability of claim payments is determined in step 260. Step 262, for example, can include the geographic determination of an insurance rating described above with reference to FIG. 19. In step 264, specified dollar limits of coverage are determined for the covered diagnoses including at least some diagnoses that have traditionally been excluded from coverage. The dollar limit calculated in step 262 may be based at least in part on the risk and probability determination made in step 260—for example—the greater the risk the lower the dollar limit of coverage. A premium necessary to ensure profitability is determined in step 264 based at least in part on the determinations made in steps 260 and 262. For example—as the risks and/or dollar limits of coverage increase so does the premium. Regulatory approval is obtained in step 266, the insurance product is marketed in step 268, and insured clients are services in step 270.

Conclusion:

While there are shown and described certain embodiments of the invention, it is to be distinctly understood that this invention is not limited thereto but may be variously embodied to practice within the scope of the following claims.

The diagrams of FIGS. 1, 2, 5, 7-10, 13, and 14 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

The Exemplary screen views of FIGS. 3 and 4 are just that. The merely provide examples of user interfaces displaying controls for performing various tasks such as specifying health conditions in an enrollment application and specifying a diagnosis when claiming benefits.

Although the flow diagrams of FIGS. 15-21 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details, and embodiments may be made without departing from the spirit and scope of the invention that is defined in the following claims.

What is claimed is:

1. A computer-implemented method for insurance enrollment and underwriting, comprising:
    displaying on a display of a computer system a first user interface with one or more controls configured to receive user input to specify a breed of a pet to be insured and to specify one or more health conditions of the pet in an enrollment application for pet health insurance;
    receiving on the computer system data representing the breed of the pet and one or more health conditions specified through the first user interface;
    electronically processing on the computer system the data representing the one or more health conditions and electronically flagging each condition as a condition that is acceptable, precluded, or for manual review, wherein the flagging is based on the breed of the pet;
    calculating on the computer system a geographic insurance rating, including:
    identifying a location associated with the pet;
    identifying a geographic risk zone;
    comparing the location to the geographic risk zone to determine if the location is at least partially within the geographic risk zone; and
    calculating an insurance rating according to the comparison;
    calculating on the computer system a dollar limit of coverage for each of a plurality of diagnoses in lieu of one or more exclusions, the plurality of diagnoses including one or more diagnoses related to the breed of the pet and one or more of the health conditions, wherein calculating a dollar limit of coverage includes calculating a dollar limit of coverage for each of the plurality of diagnoses based at least in part on the geographic insurance rating;
    where all conditions are flagged as acceptable or determined to be acceptable following a manual review, packaging an active insurance policy on the pet, wherein the insurance policy includes coverage for each of the plurality of diagnoses up to each diagnosis' corresponding dollar limit of coverage; and
    displaying on the display a second user interface presenting information indicating approved enrollment, if all of the conditions are flagged as acceptable.

2. The computer-implemented method of claim 1, further comprising:
    displaying on the display a third user interface presenting information indicating declined enrollment if at least one of the conditions is flagged as precluded; and
    displaying on the display a fourth user interface presenting information indicating a need for a manual review if none of the conditions is flagged as precluded and at least one of the conditions is flagged as for manual review.

3. The computer-implemented method of claim 1, further comprising, after displaying the second user interface, establishing for storage on a computer-readable storage medium an electronic record associated with the active policy for pet health insurance, the electronic record including the data representing the one or more health conditions specified through the first user interface and data representing an effective date for the policy.

4. The computer-implemented method of claim 3, further comprising:
    displaying on the display a fifth user interface having controls for enabling a user to submit a claim with respect to the active policy, the controls enabling the user to specify a diagnosis for which coverage is requested;
    receiving data representing the diagnosis;
    electronically processing the data representing the diagnosis with the electronic record associated with the active policy, including comparing the data representing the diagnosis with the data representing the one or more health conditions specified through the first user interface and comparing a date of the claim with the data representing the effective date of the active policy.

5. The computer-implemented method of claim 4, wherein electronically processing includes:
    flagging the diagnosis as limited where the comparison of the data representing the diagnosis with the data representing the one or more health conditions reveals that the diagnosis is for a condition identified by the data representing the one or more health conditions; and
    otherwise determining if the diagnosis is for a suspect condition or a non-suspect condition and:
    flagging the diagnosis as covered if the diagnosis is for a non-suspect condition;
    flagging the diagnosis for manual review if the diagnosis is for a suspect condition.

6. The computer-implemented method of claim 5, wherein determining comprises:
    determining the diagnosis to be for a non-suspect condition if a length of time between the effective date of the active policy and the date of the claim exceeds a predetermined duration;
    otherwise determining the diagnosis to be for a suspect condition.

7. The computer-implemented method of claim 6 further comprising selecting the predetermined duration according to the diagnosis.

8. The computer-implemented method of claim 5, further comprising:
    displaying on the display a sixth user interface presenting information indicating claim approval if the diagnosis is flagged approved;
    displaying on the display a seventh user interface presenting information indicating claim limitation, if the diagnosis is flagged limited; and displaying on the display an eighth user interface presenting information indicating the need for a manual claim review if the diagnosis is flagged as for manual review.

9. A non-transitory computer readable storage medium having stored thereon computer readable instructions that, if executed by a computing device, cause the computing device to perform operations for insurance enrollment and underwriting, the operations comprising:

displaying on a display of a computer system a first user interface with one or more controls configured to receive user input to specify a breed of a pet to be insured and to specify one or more health conditions of the pet in an enrollment application for pet health insurance;

receiving data representing the breed of the pet and one or more health conditions specified through the first user interface;

electronically processing the data representing the one or more health conditions and electronically flagging each as a condition that is acceptable, precluded, or manual review, wherein the flagging is based on the breed of the pet; and calculating on the computer system a geographic insurance rating, including:

identifying a location associated with the pet;

identifying a geographic risk zone;

comparing the location to the geographic risk zone to determine if the location is at least partially within the geographic risk zone; and calculating an insurance rating according to the comparison;

where all conditions are and flagged as acceptable or determined to be acceptable following a manual review, calculating, a dollar limit of coverage for each of a plurality of diagnoses in lieu of one or more exclusions, the plurality of diagnoses including one or more diagnoses related to one or more of the health conditions, wherein calculating a dollar limit of coverage includes calculating a dollar limit of coverage for each of the plurality of diagnoses based at least in part on the geographic insurance rating, and packaging an active insurance policy on the pet, wherein the insurance policy includes coverage for each of the plurality of diagnoses up to each diagnosis' corresponding dollar limit of coverage; and displaying on the display a second user interface presenting information indicating approved enrollment, if all of the conditions are flagged as acceptable.

10. The medium of claim 9, the operations further comprising:

displaying on the display a third user interface presenting information indicating declined enrollment if at least one of the conditions is flagged as precluded; and displaying on the display a fourth user interface presenting information indicating a need for a manual review if none of the conditions is flagged as precluded and at least one of the conditions is flagged as for manual review.

11. The medium of claim 9, the operations further comprising, after displaying the second user interface, establishing for storage on a computer-readable storage medium an electronic record associated with an active policy for pet health insurance, the electronic record including the data representing the one or more health conditions specified through the first user interface and data representing an effective date for the policy.

12. The medium of claim 9, the operations further comprising:

displaying on the display a fifth user interface having controls for enabling a user to submit a claim with respect to the active policy, the controls enabling the user to specify a diagnosis for which coverage is requested;

receiving data representing the diagnosis;

electronically processing the data representing the diagnosis with the electronic record associated with the active policy, including comparing the data representing the diagnosis with the data representing the one or more health conditions specified through the first user interface and comparing a date of the claim with the data representing the effective date of the active policy.

13. The medium of claim 12, wherein the operation of electronically processing includes:

flagging the diagnosis as limited where the comparison of the data representing the diagnosis with the data representing the one or more health conditions reveals that the diagnosis is for a condition identified by the data representing the one or more health conditions; and otherwise determining whether the diagnosis is for a suspect condition or a non-suspect condition and:

flagging the diagnosis as covered if the diagnosis is for a non-suspect condition;

flagging the diagnosis for manual review if the diagnosis is for a suspect condition.

14. The medium of claim 13, wherein the operation of determining if the diagnosis is for a suspect condition or non suspect condition includes:

determining the diagnosis to be for a non-suspect condition if a length of time between the effective date of the active policy and the date of the claim exceeds a predetermined duration;

otherwise determining the diagnosis to be for a suspect condition.

15. The medium of claim 14, the operations further comprising selecting the predetermined duration according to the diagnosis.

16. The medium of claim 13, the operations further comprising:

displaying on the display a sixth user interface presenting information indicating claim approval if the diagnosis is flagged approved;

displaying on the display a seventh user interface presenting information indicating claim limitation, if the diagnosis is flagged as limited; and displaying on the display an eighth user interface presenting information indicating the need for a manual claim review if the diagnosis is flagged for manual review.

17. An insurance enrollment and underwriting system, comprising:

one or more server computing devices configured to be networked via a link that provides electronic communication between the one or more servers and one or more client computing devices, the one or more server computing devices comprising a processor operably connected to a non-transitory memory embodied with instructions that, when executed by the processor, cause the processor to perform operations for insurance enrollment and underwriting, the operations comprising:

providing to the one or more client computing devices a first user interface with one or more controls configured to receive user input to specify a breed of a pet to be insured and to specify one or more health conditions of the pet in an enrollment application for pet health insurance;

receiving from the one or more client computing devices data representing the breed of the pet and one or more health conditions specified through the first user interface;

electronically processing the data representing the breed of the pet and one or more health conditions specified through the first user interface to electronically flag each as a condition that is acceptable, precluded, or for manual review, wherein the flagging is based on the breed of the pet;

calculating on the computer system a geographic insurance rating, including:

identifying a location associated with the pet;

identifying a geographic risk zone;

comparing the location to the geographic risk zone to determine if the location is at least partially within the geographic risk zone; and calculating an insurance rating according to the comparison;

where all conditions are flagged as acceptable or determined to be acceptable following a manual review, calculating, a dollar limit of coverage for each of a plurality of diagnoses in lieu of one or more exclusions, the plurality of diagnoses including one or more diagnoses related to the one or more of the health conditions, wherein calculating a dollar limit of coverage includes calculating a dollar limit of coverage for each of the plurality of diagnoses based at least in part on the geographic insurance rating, and packaging an active insurance policy on the pet, wherein the insurance policy includes coverage for each of the plurality of diagnoses up to each diagnosis' corresponding dollar limit of coverage; and providing to the one or more client computing devices a second user interface presenting information indicating approved enrollment, if all of the conditions are flagged as acceptable.

18. The system of claim 17, wherein the operations further comprise:

providing to the one or more client computing devices a third user interface presenting information indicating declined enrollment if at least one of the conditions is flagged as precluded; and providing to the one or more client computing devices a fourth user interface presenting information indicating a need for a manual review if none of the conditions is flagged as precluded and at least one of the conditions is flagged as for manual review.

19. The system of claim 17, wherein, the operations further comprise, after displaying the second user interface, establishing for storage on a computer-readable storage medium an electronic record associated with an active policy for pet health insurance, the electronic record including the data representing the one or more health conditions specified through the first user interface and data representing an effective date for the policy.

20. The system of claim 17, wherein operations further comprise:

providing to the one or more computing devices a fifth user interface having controls configured to receive user input to submit a claim with respect to the active policy, the controls configured to receive user input to specify a diagnosis for which coverage is requested; and receiving data representing the diagnosis, electronically processing the data representing the diagnosis with the electronic record associated with the active policy, including comparing the data representing the diagnosis with the data representing the one or more health conditions specified through the first user interface, and comparing a date of the claim with the data representing the effective date of the active policy.

21. The system of claim 20, wherein the operations further comprise:

flagging the diagnosis as limited where the comparison of the data representing the diagnosis with the data representing one or more health conditions reveals that the diagnosis is for a condition identified by the data representing the one or more health conditions; and otherwise determining if the diagnosis is for a suspect condition or a non-suspect condition and:

flagging the diagnosis as covered if the diagnosis is for a non-suspect condition, or flagging the diagnosis for manual review if the diagnosis is for a suspect condition.

22. The system of claim 21, wherein the operations further comprise determining if the diagnosis is for a suspect condition or a non-suspect condition by:

determining the diagnosis to be for a non-suspect condition if a difference between the date of the claim and the effective date of the active policy exceeds a predetermined duration;

otherwise determining the diagnosis to be for a suspect condition.

23. The system of claim 22, wherein operations further comprise selecting the predetermined duration according to the diagnosis.

24. The system of claim 21, wherein the operations further comprise:

returning a sixth user interface presenting information indicating claim approval if the diagnosis is flagged approved;

returning a seventh user interface presenting information indicating claim limitation, if the diagnosis is flagged as limited; and returning an eighth user interface presenting information indicating the need for a manual claim review if the diagnosis is flagged for manual review.

25. A computer-implemented method for insurance enrollment and underwriting, comprising:

causing to be displayed on a display a first user interface with one or more controls configured to receive user input in an enrollment application for pet health insurance, the user input specifying a breed of a pet to be insured, one or more health conditions of the pet, and a location associated with the pet;

receiving, on a computer system, data specified through the first user interface, the data representing the breed of the pet, the one or more health conditions, and the location associated with the pet;

comparing the location associated with the pet to an identified geographic risk zone to determine if the location is at least partially within the geographic risk zone and calculating a geographic insurance rating according to the comparison;

electronically processing on the computer system the data representing the one or more health conditions and electronically flagging each condition as a condition that is acceptable, precluded, or for manual review, wherein the flagging is based on the breed of the pet;

calculating on the computer system a dollar limit of coverage for each of a plurality of diagnoses based at least in part on the geographic insurance rating, the plurality of diagnoses including one or more diagnoses related to the breed of the pet and one or more of the health conditions;

where all conditions are flagged as acceptable or determined to be acceptable following a manual review, packaging an active insurance policy on the pet, wherein the insurance policy includes coverage for each given diagnosis of the plurality of diagnoses up to the corresponding dollar limit of coverage of the given diagnosis; and displaying on the display information indicating approved enrollment, if all of the conditions are flagged as acceptable.

26. The computer-implemented method of claim 25, further comprising:

displaying on the display information indicating declined enrollment if at least one of the conditions is flagged as precluded; and displaying on the display information indicating a need for a manual review if none of the conditions is flagged as precluded and at least one of the conditions is flagged as for manual review.

27. The computer-implemented method of claim 25, further comprising, after displaying information indicating approved enrollment, establishing for storage on a computer-readable storage medium an electronic record associated with the active policy for pet health insurance, the electronic record including the data representing the one or more health conditions specified through the first user interface and data representing an effective date for the policy.

28. The computer-implemented method of claim 27, further comprising:

displaying on the display a user interface having controls for enabling a user to submit a claim with respect to the active policy, the controls enabling the user to specify a diagnosis for which coverage is requested;

receiving data representing the diagnosis;

electronically processing the data representing the diagnosis with the electronic record associated with the active policy, including comparing the data representing the diagnosis with the data representing the one or more health conditions specified through the first user interface and comparing a date of the claim with the data representing the effective date of the active policy.

29. The computer-implemented method of claim 28, wherein electronically processing includes:

flagging the diagnosis as limited where the comparison of the data representing the diagnosis with the data representing the one or more health conditions reveals that the diagnosis is for a condition identified by the data representing the one or more health conditions; and otherwise determining if the diagnosis is for a suspect condition or a non-suspect condition and:

flagging the diagnosis as covered if the diagnosis is for a non-suspect condition;

flagging the diagnosis for manual review if the diagnosis is for a suspect condition.

30. The computer-implemented method of claim 29, wherein determining comprises:

determining the diagnosis to be for a non-suspect condition if a length of time between the effective date of the active policy and the date of the claim exceeds a predetermined duration;

otherwise determining the diagnosis to be for a suspect condition.

31. The computer-implemented method of claim 30 further comprising selecting the predetermined duration according to the diagnosis.

32. The computer-implemented method of claim 29, further comprising:

displaying on the display information indicating claim approval if the diagnosis is flagged approved;

displaying on the display information indicating claim limitation, if the diagnosis is flagged limited; and displaying on the display information indicating the need for a manual claim review if the diagnosis is flagged as for manual review.

33. The computer-implemented method of claim 25, wherein the causing to be displayed on a display occurs as a result of a request for the first user interface by a client computing device transmitted to the computer system over a network.

* * * * *